J. D. MURPHY.
COUNTERBALANCED GATE FOR CONVEYER TRACKS.
APPLICATION FILED SEPT. 26, 1918.
1,303,574.
Patented May 13, 1919.
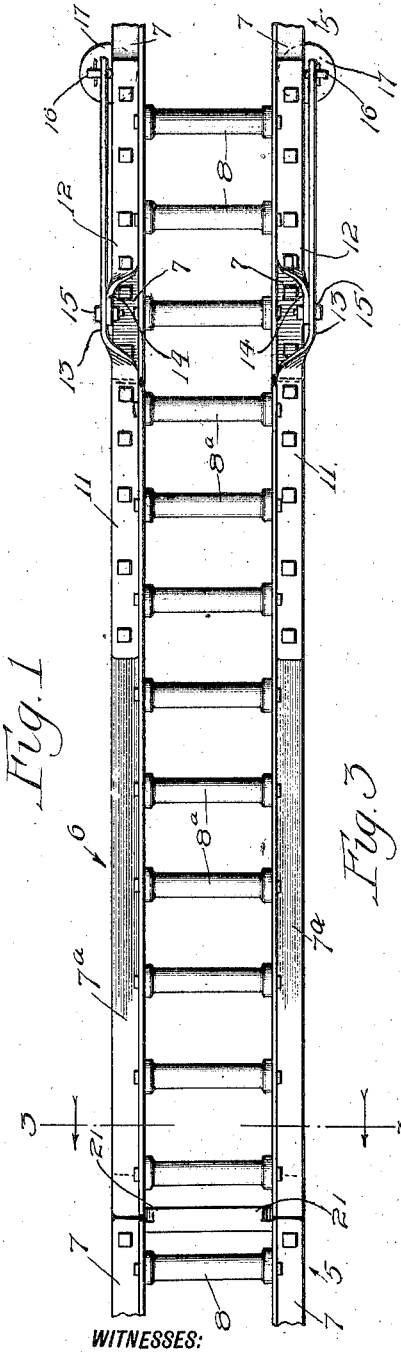
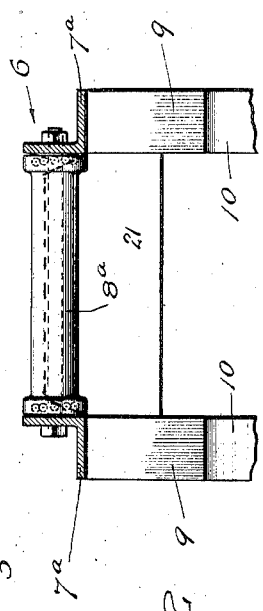
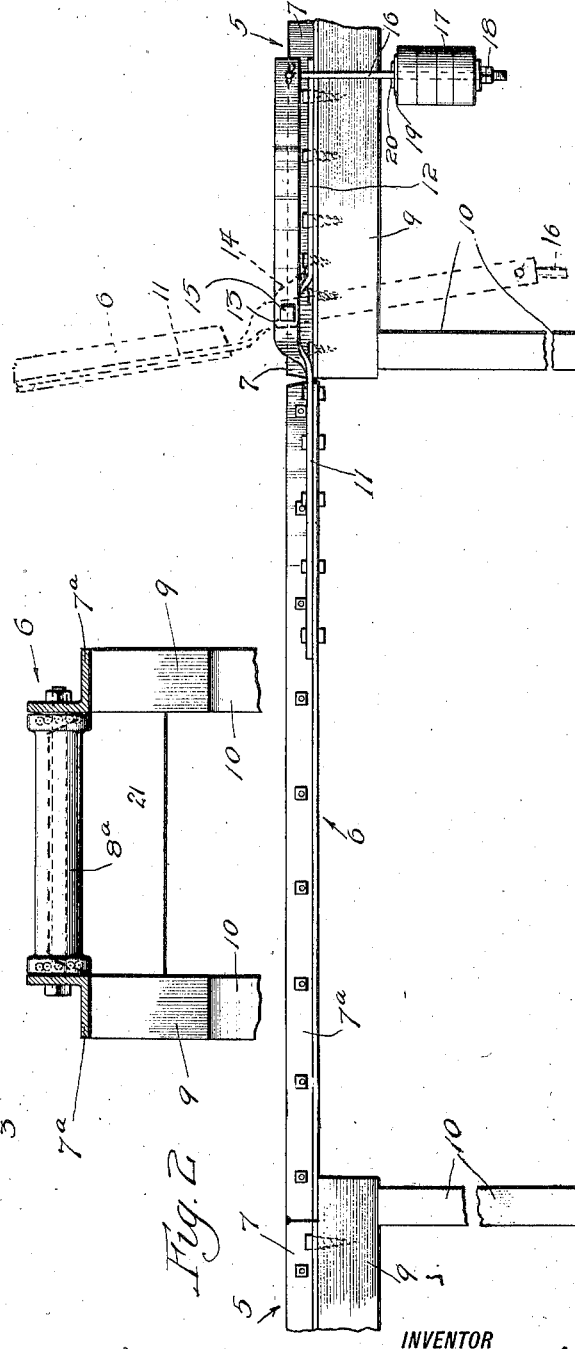
WITNESSES:
Harry S. Gaither
INVENTOR
John D. Murphy
BY
Charles O. Skewey
his ATTORNEY

UNITED STATES PATENT OFFICE.

JOHN D. MURPHY, OF CHICAGO, ILLINOIS.

COUNTERBALANCED GATE FOR CONVEYER-TRACKS.

1,303,574.  Specification of Letters Patent.  Patented May 13, 1919.

Application filed September 26, 1918. Serial No. 255,754.

*To all whom it may concern:*

Be it known that I, JOHN D. MURPHY, a citizen of the United States, and a resident of Chicago, Cook county, and State of Illinois, have invented certain new and useful Improvements in Counterbalanced Gates for Conveyer-Tracks, of which the following is declared to be a full, clear, and exact description.

This invention relates to counterbalanced gates for conveyer tracks and its principal object is to provide efficient means in conveyer tracks, whereby gaps may be left in the track to afford passage ways across the plane of the track, said gaps being spanned by counter weighted gates which normally close the gaps, thereby forming a continuation of the track, but which gates may be readily raised to permit passage through the gap.

In large factories, mills and other shops where great quantities of materials of a similar kind are manufactured, a track or conveyer is employed upon which the objects are placed, and moved from one part of the factory to other parts thereof. For instance in munition factories, shells are moved upon a track from one workman to another, each workman performing certain labor upon the shell, then placing it upon the track and pushing it along to the next station. This is usually done by placing the shells upon the track, one after the other, and pushing the entire row ahead with the last shell.

In factories where these tracks extend for hundreds of feet, it is necessary to provide passage ways or aisles across the tracks and considerable difficulty has been encountered in the production of a counterweighted gate which can be raised and lowered quickly and which will not take up any appreciable amount of additional space. With the present invention, overhead supported counterweights, pulleys, cables and the like are dispensed with and a simple, efficient and practical counterweighted gate is provided.

The invention consists in the several novel features hereinafter fully set forth and claimed.

The invention is clearly illustrated in the accompanying drawings, in which:

Figure 1, is a plan of a fragment of a conveyer track in which is embodied a gate containing one form of the present invention; Fig. 2, is a side elevation of the parts seen in Fig. 1, and Fig. 3, is a detail cross section taken on the line 3—3 of Fig. 1.

Referring to said drawings, the reference character 5, designates a conveyer track, which may be constructed of any desired length. Where an aisle or passage way across the track is required, the track is cut away to leave a gap between the ends thereof which is closed by a gate 6, hinged to the track at one side of the gap as will appear later. The track and gate are formed of parallel angle iron bars 7, 7$^a$, and rollers 8, 8$^a$, which extend between the bars 7, 7$^a$ and are journaled thereon. Anti-friction bearings are provided between the bars and rollers to reduce the friction therebetween to a minimum.

Preferably other lengthwise extending supports 9, are provided under the angle iron bars 7, of the stationary track and posts or legs 10, are secured to said supports and carry the track at a suitable plane above the floor, in convenient position to facilitate the placing of shells or other objects on the track or removing them therefrom. The angle iron bars 7, of the stationary track are bolted or otherwise securely fastened to said supports 9.

To the hinge end of the gate are bolted or otherwise secured two flat bars 11, which coöperate with two flat bars 12, that are bolted or otherwise secured to the adjacent stationary portion of the track, to provide a hinge connection between the gate and stationary portion of the track. The bars 11, 12 are bolted to the horizontal webs of the angle iron bars and the bars 11 have end portions 13, which protrude beyond the gate. The end portions 14, of the bars 12, and the protruding end portions 13, of the bars 11, are twisted to extend in a vertical direction and are bent outward, but parallel with the rails, as seen in Fig. 1. The adjacent vertical end portions 13, 14 are formed with alined holes, through which extend bolts 15, which have nuts threaded in their ends and hingedly connect the gate with the stationary track.

The protruding end portions 13, of the bars 11, extend back beyond the hinge connection and are provided with holes near their ends into which are secured rods 16, which carry weights 17. The weights may be made in sections and as many sections may be employed as are necessary to counterbalance the gate. Conveniently, the lower ends of the rods 16 are threaded, and nuts 18, secured upon the threaded ends of the rods hold the weights on the rods. Washers 19, and cotter pins 20, above the weights keep them in place and prevent them from rattling. The horizontal supporting members 9, project beyond the ends of the stationary angle iron bars 7, at the free end of the gate and act to support it when lowered. To guide the gate to its lowered position, a cross piece 21, is secured to the supporting members 9, and has inclined faces which engage with the sides of the gate and bring it into alinement with the stationary angle iron bars of the track.

In use, when the gate is lowered, it overbalances the counterweights and remains in lowered position, thereby closing the gap. Shells or other objects may be slid from one part of the track and across the gate as is well understood. When it is desired to pass through the gap, the gate is raised and the counterweights thereby lowered, which thereupon hold the gate in its raised position. The gate is closed by pushing it down upon the supporting members.

It is to be observed that the counterweights occupy very little space, do not obstruct the passageway and do not interfere with the handling of shells on the track, but the space above the track remains unobstructed. Furthermore by hinging the gate back of the gap between the stationary sections of the track, the gate, when raised, will stand in a plane back of the gap so as not to interfere with the free passage of trucks and the like through the gap. By properly positioning the hinge, the counterweights may be caused to strike against the adjacent posts 10 when the gate is raised to open position and thereby prevent it from being swung back too far.

I claim as new and desire to secure by Letters Patent:

1. The combination of a stationary track having a gap therein, a gate at said gap and forming a continuation of said track, said track and gate being constructed of parallel spaced bars and transverse rollers journaled thereon, and adapted to support objects which are slid along the same; bars secured to said track and to said gate and having sidewise bent end portions hingedly secured together at points beyond the gate, the bars which are secured to the gate having rearward extensions, and counterweights secured to said extensions.

2. The combination of a stationary track having a gap therein, a gate at said gap and forming a continuation of said track, said track and gate being constructed of parallel spaced angle iron bars, and transverse rollers journaled thereon, and adapted to support objects which are slid along the same; flat bars secured to said track and to said gate and having end portions twisted into vertical planes and hingedly secured together, the bars which are secured to the gate having rearward extensions, and counterweights secured to said extensions.

3. The combination of a stationary track having a gap therein, a gate at said gap and forming a continuation of said track, said track and gate being constructed of parallel spaced angle iron bars, and transverse rollers journaled thereon, and adapted to support objects which are slid along the same; bars secured to said track and to said gate and having sidewise bent end portions hingedly secured together at points beyond the gate, the bars which are secured to the gate having rearward extensions, free swinging rods secured to the free ends of said extensions; and counterweights removably secured on said rods.

4. The combination of a stationary track having a gap therein, a gate at said gap and forming a continuation of said track, said track and gate being constructed of parallel, spaced angle iron bars, and transverse rollers journaled thereon, and adapted to support objects which are slid along the same; bars secured to said track and to said gate and having end portions bent outwardly in sidewise directions and hingedly secured together, the bars which are secured to the gate having rearward extensions, and counterweights secured to said extensions.

5. The combination of a stationary track having a gap therein, a gate at said gap and forming a continuation of said track, said track and gate being constructed of parallel spaced bars and transverse rollers journaled thereon, and adapted to support objects which are slid along the same; bars secured to said track and to said gate and having end portions hingedly secured together on a line beyond the gate, the bars which are secured to the gate having rearward extensions, and counterweights secured to said extensions.

JOHN D. MURPHY.